United States Patent
Tanaka et al.

[15] 3,679,296
[45] July 25, 1972

[54] AUTOMATIC EXPOSURE DEVICE FOR MICROSCOPIC MOTION PICTURE PHOTOGRAPHY

[72] Inventors: Hiroshi Tanaka; Toshiyuki Arai, both of Yokohama, Japan

[73] Assignee: Nippon Kogaku K.K., Tokyo, Japan

[22] Filed: Feb. 22, 1971

[21] Appl. No.: 117,438

[30] Foreign Application Priority Data

Feb. 25, 1970  Japan..................................45/17888

[52] U.S. Cl..........................................352/84, 95/10, 95/12, 95/53 EA, 352/131, 256/201
[51] Int. Cl. ......................................................G03b 41/00
[58] Field of Search ..........................352/84, 131, 204, 244; 95/10 C, 12, 53 E, 53 EA, 53 EB; 256/201

[56] References Cited

UNITED STATES PATENTS

| | | |
|---|---|---|
| 2,893,289 | 7/1959 | Edgerton..............................95/12 X |
| 3,106,129 | 10/1963 | Frenk et al.................................95/12 |
| 3,340,764 | 9/1967 | Bergson..............................356/177 |

*Primary Examiner*—Samuel S. Matthews
*Assistant Examiner*—Robert P. Greiner
*Attorney*—Ward, McElhannon, Brooks & Fitzpatrick

[57] ABSTRACT

An automatic exposure device for taking microscopic motion pictures in which preliminary light of a suitable intensity is thrown upon a photoconductive element and during photographing operation such preliminary illumination is eliminated while the photoconductive element is illuminated solely by light to be measured, whereby the photo-response speed of the photoconductive element may be increased to ensure more accurate exposure measurement to be effected.

1 Claim, 4 Drawing Figures

AUTOMATIC EXPOSURE DEVICE FOR MICROSCOPIC MOTION PICTURE PHOTOGRAPHY

BACKGROUND OF THE INVENTION

1. Field of the Invention

This invention relates to improvements in automatic exposure device for microscopic motion picture photography, and more particularly in the light receiving portion of an automatic exposure device for achieving a proper exposure during microscopic motion picture photography.

2. Description of the Prior Art

In microscopic motion pictures known as the so-called fine speed photography in which photographing operation takes place at intervals of several seconds to several tens of minutes, it is desirable if an object such as a specimen illustrating histological cultivation is photographed by the use of a phase-difference microscope that the specimen be illuminated only during the photographing operation and not illuminated at all during the other time, because the specimen is likely to be affected by light and heat.

The exposure device for taking ordinary pictures or motion pictures generally utilizes a photoconductive element in the light measuring portion thereof, and the photo-responsive characteristic of such photoconductive element is variable with the intensity of light thrown thereon, in such a manner that the response is quicker for higher intensity of light and slower for lower intensity of light, as shown in the graph of FIG. 1.

Moreover, if the photoconductive element is left in the dark for a long time, the photo-response speed thereof will become lower in accordance with the length of that time as illustrated in the graph of FIG. 2. Therefore, in case where fine speed photography is to be effected of a specimen under a relatively low degree of illumination as in the above-described case of taking a phase-difference microscopic motion picture of a histological cultivation, the exposure device having a photoconductive element forming the light measuring portion could not properly operate if the device is used without the construction thereof being reformed in any way, and this may result in an over-exposure or an improper shutter operation. Such a disadvantage may be overcome by increasing the photo-response speed of the photoconductive element itself, whereas this in turn results in the aggravation of other characteristic such as thermal characteristic of the photoconductive element as well as in the variation of the spectral sensitivity thereof. Thus, such photoconductive element is unsuitable for the light measuring portion of the exposure device for taking ordinary photographs and motion pictures.

SUMMARY OF THE INVENTION

In view of the above, it is the object of the present invention to provide an automatic exposure device for taking microscopic motion pictures in which preliminary light of a suitable intensity is thrown upon a photoconductive element and during photographing operation such preliminary illumination is eliminated while the photoconductive element is illuminated solely by light to be measured, whereby the photo-response speed of the photoconductive element may be increased to ensure exposure measurement to be effected with highter accuracy.

The above object and features of the present invention will become more apparent from the following detailed description of an embodiment thereof taken in conjunction with the accompanying drawings.

DESCRIPTION OF THE PREFERRED EMBODIMENT

The invention will be described hereunder with respect to the drawings, in which symbol M represents the essential part of a microscope device, S a specimen, O an objective lens, F the focal plane of the objective lens, and C a condenser lens for illumination.

Figure 1:
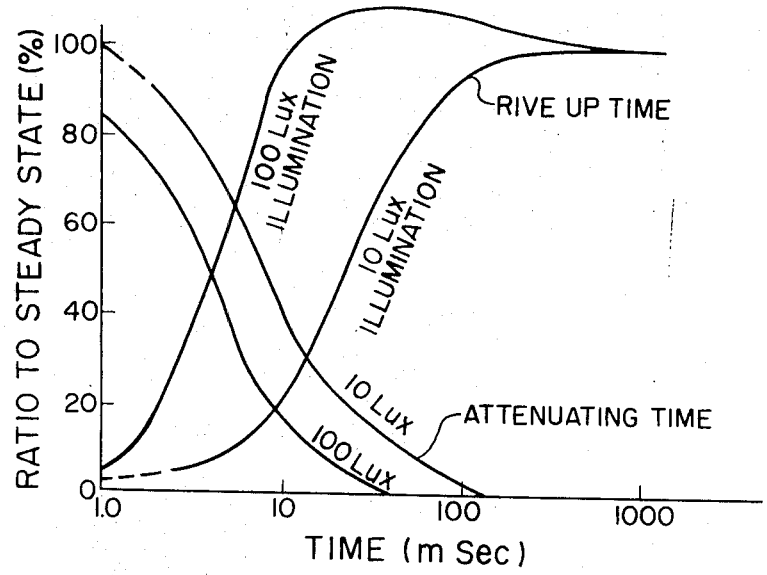
FIG. 1 is a graph for illustrating the photo-responsive characteristic of a photoconductive element such as CdS.
Figure 2:
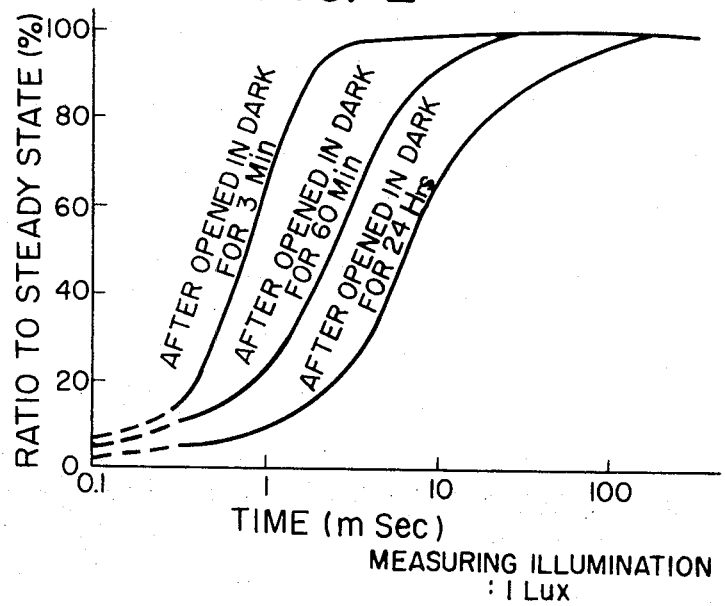
FIG. 2 is a graph for illustrating the rising characteristic of the same photoconductive element when its preceding conditions are varied.
Figure 3:
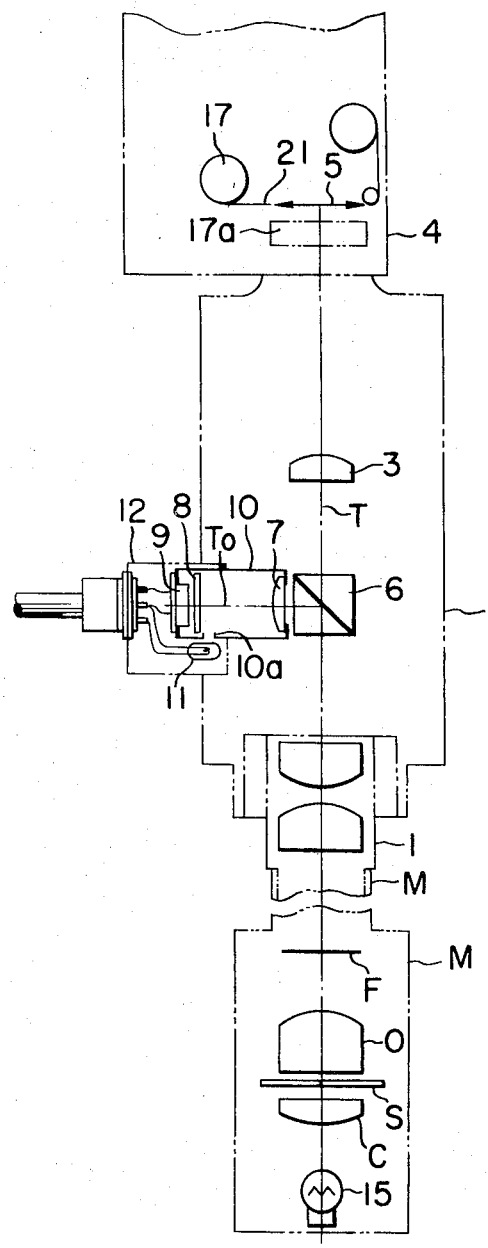
FIGS. 3 and 4 are schematic views showing the automatic exposure device embodying the present invention.

Referring first to FIG. 3, the microscope device includes an eyepice 1, a microscope body tube 2 for motion picture photography, and a projection lens 3 disposed in the body tube 2, all being disposed coaxially so that a light flux from the specimen S may be thrown onto the film surface 5 in a motion picture camera 4 to form an image thereon. Within the body tube 2 and between the eyepiece 1 and the projection lens 3, there is a semi-reflecting prism 6 disposed in the path of light from the specimen so as to divide the light flux from the eyepiece 1 into two light beams, i.e. a projection light beam T and a measured light beam To for illuminating a photoconductive element 9 such as CdS which will be described later. In the light path along which the measured light beam To is reflected, there is a light measuring condenser lens 7 for directing therethrough the measured light beam To to illuminate a mat glass 8, so that the measured light beam To thrown upon the mat glass 8 may be received by the photoconductive element such as CdS. The condenser lens 7, the mat glass 8 and the photoconductive element 9 are all disposed coaxially within a light measuring case 10, which has an opening 10a in the periphery thereof. An auxiliary lamp 11 is provided to throw a slight amount of light upon the photoconductive element 9 through the opening 10a of the light measuring case 10. The case 10 is in turn covered partly with an outer cover 12 so that the auxiliary lamp 11 is enclosed therewithin.

Figure 4:
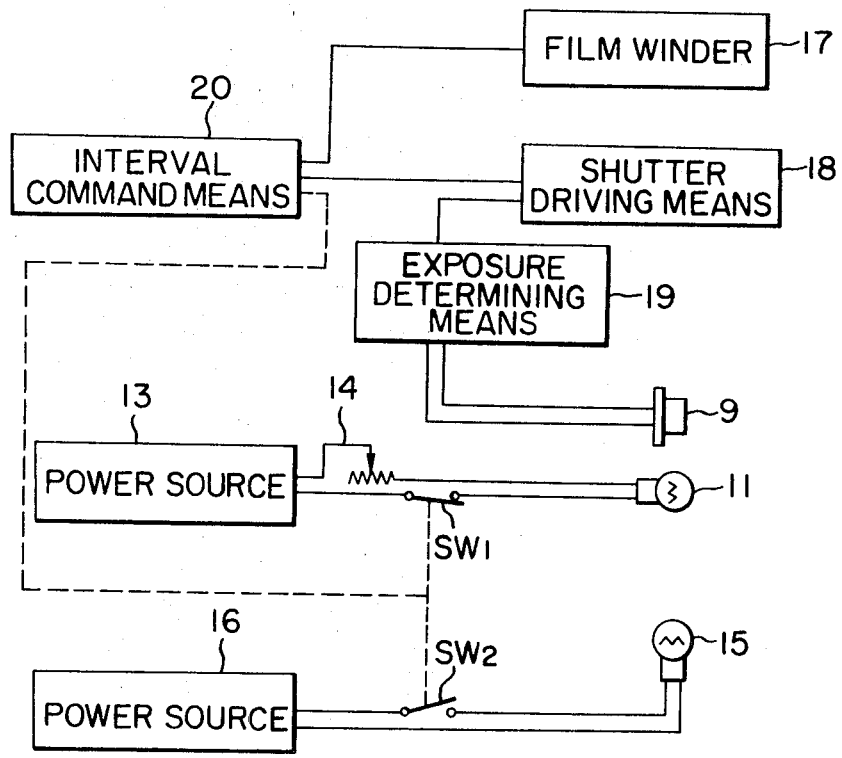

Referring to FIG. 4, the auxiliary lamp 11 is connected with its electric power source 13. Between the auxiliary lamp 11 and the power source 13 there is inserted a light intensity adjuster 14 such as a variable resistor for adjusting the light intensity of the lamp 11. There is also shown a specimen illuminator lamp 15 connected with its electric power source 16. Switches SW1 and SW2 are provided to constitute switch means which is arranged such that the switch SW2 is open when the switch SW1 is closed in response to a electrical command from an interval command means 20 to be described and that the switch SW2 is changed over into closed position when the switch SW1 is opened. A film winder 17 of the known type is such that it charges a shutter 17a (FIG. 3) each time it winds up a film 21 (FIG. 3) by half a frame thereof in response to a command from the interval command means 20. Shutter driving means 18 is also provided to open the shutter 17a in response to a command from the interval command means 20 and close the shutter 17a with the aid of exposure determining means 19 which is an exposure meter of the known type adapted to adjust the opening-closing time of the shutter 17a in accordance with the quantity of light received by the photoconductive element 9. The interval command means 20 serves to control the time intervals for photographing operation, and it is arranged so as to supply a command to each of the film winder 17, the shutter driving means 18 and the switches SW1 and SW2 during photography and also to supply a command to the film winder 17 and the switches SW1 and SW2 in response to the shutter closing action of the shutter driving means 18.

With the described arrangement, a command is supplied from the interval command means 20 to each of the film winder 17 and switches SW1 and SW2 in response to the closing of the shutter 17a, thereby first winding the film 21 by half a frame thereof and closing the switch SW1 while opening the switch SW2.

As a result, the auxiliary lamp 11 is turned on and at the same time the specimen illuminator lamp 15 is turned off, so that no light is thrown upon the specimen but a slight amount of light is emitted from the auxiliary lamp 11 to the photoconductive element 9. After a predetermined time interval required for photography, a command is supplied from the interval command means 20 to each of the film winder 17 and switches SW1 and SW2, so that the film 21 which has previously been wound by a half frame is wound by a further half of a frame, and thus the film is wound up by a full one frame, while at the same time the switch SW1 is opened but the switch SW2 is closed to thereby turn off the auxiliary lamp 11 and turn on the specimen illuminator lamp 15.

Thereupon, the photoconductive element 9 receives the light flux from the specimen so that the exposure determining means 19 adjusts the opening-closing time of the shutter 17a. Thereafter, the shutter driving means 18 is operated in response to a command from the interval command means 20 to open the shutter 17a, and after a predetermined time interval, the shutter 17a is closed by the exposure determining means 19.

Upon closing of the shutter 17a, the film winder 17 is again operated by the interval command means 20 to wind up the film 21 by a further half frame, whereupon the switch SW1 is closed while the switch SW2 is opened. Thus, the auxiliary lamp 11 is again turned on while the specimen illuminator lamp 15 is turned off, whereby the device resumes its initial position.

According to the present invention, as will be appreciated from the foregoing description, the specimen is illuminated during photography and the light from the specimen is received and measured by the photoconductive element 9, and during other time than photography the photoconductive element 9 alone is illuminated by the auxiliary lamp 11, whereby the element can very quickly respond to the light to be measured. This ensures a proper exposure for photography and further ensures the specimen to be illuminated only during photography, which in turn leads to a practical advantage that the possible influence of light and heat upon the specimen may be minimized.

We claim:

1. A microscopic device for fine speed motion picture photography comprising:
    i. means for illuminating a specimen;
    ii. photographing means including a photographing optical system combined with the microscopic optical system of said microscope, a photographing frame, film transport means and shutter means;
    iii. exposure determining means for measuring the intensity of light transmitted through the objective optical system of said microscopic optical system and thereby determining the exposure time of said shutter means, said exposure determining means including a photoconductive element for receiving said light transmitted through said objective optical system;
    iv. auxiliary illuminator means for illuminating said photoconductive element to maintain the photo-response speed thereof;
    v. switch means for alternately operating said specimen illuminator means and said auxiliary illuminator means to thereby alternately illuminate said specimen and said photoconductive element; and
    vi. means for controlling time intervals for the fine speed motion picture photography, said control means serving to determine the time intervals for photography, control said switch means prior to photography so that said specimen illuminator means is operated while said auxiliary illuminator is inoperative, then control said film transport means so that unexposed film is transported to said photographing frame, thereafter control said shutter means so as to expose said film to light, and again control said film transport means after the completion of operation of said shutter means so that the photographed film is transported out of said photographing frame.

* * * * *